(12) United States Patent
Richmond et al.

(10) Patent No.: US 11,459,890 B2
(45) Date of Patent: Oct. 4, 2022

(54) ROTARY ENGINE ROTOR WITH LIP AND A RECESS ON THE FLANK

(71) Applicant: UAV Engines Ltd., Lichfield (GB)

(72) Inventors: Roy Richmond, Lichfield (GB); Christopher John Biddulph, Stoke on Trent (GB); Jonathan Mark Bagnell, Lichfield (GB)

(73) Assignee: UAV Engines Ltd.

(*) Notice: Subject to any disclaimer, the term of this patent is extended or adjusted under 35 U.S.C. 154(b) by 192 days.

(21) Appl. No.: 15/930,849

(22) Filed: May 13, 2020

(65) Prior Publication Data

US 2020/0270991 A1 Aug. 27, 2020

Related U.S. Application Data

(63) Continuation of application No. 15/323,168, filed as application No. PCT/EP2016/052786 on Feb. 10, 2016, now abandoned.

(30) Foreign Application Priority Data

Feb. 11, 2015 (EP) .................... 15154727

(51) Int. Cl.
*F01C 1/22* (2006.01)
*F01C 19/02* (2006.01)
*F01C 21/08* (2006.01)
*F02B 55/14* (2006.01)
*F02B 53/00* (2006.01)

(52) U.S. Cl.
CPC ............. *F01C 1/22* (2013.01); *F01C 19/02* (2013.01); *F01C 21/08* (2013.01); *F02B 55/14* (2013.01); *F02B 2053/005* (2013.01); *F04C 2250/20* (2013.01)

(58) Field of Classification Search
CPC ... F01C 1/22; F02B 2053/005; F04C 2250/20
See application file for complete search history.

(56) References Cited

U.S. PATENT DOCUMENTS

| | | | |
|---|---|---|---|
| 3,584,607 | A | 6/1971 | Yamamoto |
| 3,683,868 | A | 8/1972 | Panhard |
| 4,066,044 | A | 1/1978 | Jones et al. |
| 4,192,634 | A | 3/1980 | Campos et al. |
| 4,308,002 | A | 12/1981 | Stefano |

(Continued)

FOREIGN PATENT DOCUMENTS

| | | |
|---|---|---|
| CA | 2834082 A1 | 5/2014 |
| CN | 1114027 C | 7/2003 |
| EP | 2497902 A1 | 9/2012 |

(Continued)

*Primary Examiner* — Mary Davis
(74) *Attorney, Agent, or Firm* — GrayRobinson, P.A.; Michael J. Colitz, III

(57) ABSTRACT

A rotary engine rotor (10) comprising three rotor flanks (12) arranged in a generally equilateral triangle shape, each rotor flank (12) having a leading edge (16) and a trailing edge (17), an elongate lip (21) being provided on the leading edge (16) of at least one of the rotor flanks (12), the elongate lip (21) extending the full axial length of the rotor flank (12). In another aspect, at least one rotor flank (12) comprises a cavity having a leading edge and a trailing edge, and at least a portion of the base of the cavity proximal to a trailing edge thereof is curved outwardly.

6 Claims, 5 Drawing Sheets

(56) References Cited

U.S. PATENT DOCUMENTS 8,312,859 B2    11/2012  Rom et al.

FOREIGN PATENT DOCUMENTS

| GB | 1506088 A | 4/1978 |
| GB | 1547890 A | 6/1979 |
| JP | S59101547 | 6/1984 |
| JP | H07224673 A | 8/1995 |

ROTARY ENGINE ROTOR WITH LIP AND A RECESS ON THE FLANK

CROSS-REFERENCE TO RELATED APPLICATION

This application is a continuation of and claims priority to application Ser. No. 15/323,168 filed Dec. 30, 2016, which is a continuation of and claims priority under 35 U.S.C. § 371 to International Application No. PCT/EP2016/052786 filed on Feb. 10, 2016, which in turn claims priority to EP App. No. 15154727.0 filed on Feb. 11, 2015. The contents of all these applications are incorporated herein by reference for all purposes.

TECHNICAL FIELD

The invention relates to a rotary engine rotor and particularly but not exclusively to a Wankel engine rotor.

BACKGROUND

Rotary internal combustion engines are commonly used to power automobiles, aircrafts, boats, stationary engines and compressors. A rotary internal combustion engine comprises a rotary piston or rotor rotatably mounted within a cavity in a housing or stator.

Wankel engines are a particular form of rotary internal combustion engine in which the stator comprises a two-lobed epitrochoidal bore and end plates located at opposing longitudinal ends of the bore to define a cavity therein. The walls of the cavity being provided with inlet and exhaust ports for air and exhaust gases respectively. The rotor of a Wankel engine includes three rotor flanks of generally equilateral triangular sectional shape with outwardly curved sides.

The rotor is mounted on an eccentric journal of a main shaft and is geared to rotate in a planetary manner within the cavity at one third of the rotation of the main shaft. The gearing of the rotor is typically provided by means of an insert received within a location aperture provided by an inner surface of the body. The insert comprises a bearing part and an indexing gear, the indexing gear being arranged to engage with a fixed gear carried by one of the end plates of the engine. The engagement of the indexing gear with the fixed gear constrains the rotation of the rotor to one third that of the main shaft. The insert is required to be firmly secured to the body of the rotor in order to prevent rotation or axial movement of the insert relative to the rotor body.

Apex seals are provided at each of the three apexes of the rotor, the seals being configured to engage with the inner wall of the epitrochoidal bore. As the rotor rotates relative to the stator, the apex seals are displaced relative to the inner walls of the epitrochoidal bore but remain in sealing engagement therewith throughout the rotational cycle of the rotor. The rotor thus divides the cavity into a plurality of working chambers that vary in volume and position as the rotor rotates relative to the stator.

The shape of the outer surface each rotor flank has historically been chosen to maximize the compression ratio of the engine. This has resulted in outwardly curved bow-shaped flanks that are symmetric with respect to reflection about an axial plane that perpendicularly bisects the two apexes of the flank. It is also known to form shallow dish-shaped pockets substantially centrally within the flanks, the base of the pockets being curved inwardly at both the leading edge and the trailing edge thereof. Like the bow-shaped flanks, the shape, size and location of these pockets are typically chosen to maximize the compression ratio of the engine.

SUMMARY

According to the present invention there is provided a rotary engine rotor as claimed in the accompanying claims.

In accordance with the present invention, as seen from a first aspect, there is provided a rotary engine rotor comprising three rotor flanks arranged in a generally equilateral triangle shape, each rotor flank having a leading edge and a trailing edge, the leading edge of at least one of the rotor flanks comprising an elongate lip that extends the full axial length of the rotor flank.

It has been found by the applicants that a rotor in accordance with the present invention improves the performance of the engine, for example by providing an increase in power and a reduction in temperature. This improvement in performance may be attributed to an increased efficiency in converting combustion gas expansion to torque. This mechanism of improving engine performance is in contrast to established design practices in the industry, where any improvement in the performance in the engine is generally realized by improving the compression ratio of the engine.

Preferably the at least one rotor flank comprises a generally outwardly curved profile from the lip to the trailing edge of the rotor flank.

The lip preferably comprises a leading face and a trailing face. The leading face is preferably directed outwardly with respect to a circumferential centre of the rotor flank defined as the circumferential position equidistant between the leading face and trailing face of the rotor flank. The trailing face is preferably directed inwardly towards the circumferential centre of the rotor flank. Since the lip is located at the leading edge of the rotor flank, directing the trailing face of the lip inwardly towards the circumferential centre of the rotor flank ensures that a normal to the surface of the trailing lip is directed in a circumferentially opposite direction to the direction of rotation of the rotor, thereby providing efficient conversion of expansion gas pressure to torque on the rotor.

The leading face of the lip is preferably curved radially outwardly. The radius of curvature of the leading face of the lip is preferably substantially equal to the radius of curvature of the at least one rotor flank proximal to the trailing edge thereof.

The trailing face of the lip may be curved radially inwardly. Preferably the radius of curvature of the trailing face of the lip is substantially smaller than the radius of curvature of the leading face of the lip and/or the radius of curvature of the at least one rotor flank proximal to the trailing edge thereof. The radius of curvature of the trailing face of the lip is preferably between 0.2-9.0 mm, preferably between 1.0-8.0 mm, preferably between 2.0-7.0 mm, or preferably between 3.0-6.0 mm. A surface element of the trailing surface of the lip adjacent the leading surface thereof preferably comprises a normal in a direction substantially opposite to the direction of rotation of the rotor. A surface element of the trailing surface of the lip distal to the leading surface thereof preferably comprises a normal directed substantially radially i.e. substantially perpendicular to the direction of rotation of the rotor. Alternatively, the trailing face of the lip may have a stepped profile. Preferably, the stepped profile may compromise steps.

The curvature of the trailing face of the lip intermediate the two above-mentioned surface elements is preferably substantially uniform. Alternatively, the curvature of the trailing face of the lip intermediate the two above-mentioned surface elements preferably increases with increasing distance from the leading face of the lip.

Alternatively, the trailing face of the lip may be substantially planar. The direction of the normal to the trailing face of the lip is preferably substantially opposite to the direction of rotation of the rotor.

The rotor preferably comprises a central aperture for receiving a shaft of the stator. The central aperture is preferably provided with an annular gear on an inner face thereof and the shaft of the stator preferably comprises a pinion. The radius of the annular gear is preferably greater that the radius of the pinion such that the annular gear is configured for eccentric movement about the pinion.

Preferably the radial extent of the leading edge of the at least one rotor flank with respect the central aperture of the rotor is substantially equal to the radial extent of the trailing edge of the at least one rotor flank. The lip in this embodiment is thus defined in part by a recess formed in the outer surface of the rotor flank and extending the full axial length of the rotor flank. It will be appreciated that in this embodiment, a leading face of the recess is equivalent to the trailing face of the lip.

The cross-section of the lip is preferably substantially uniform.

A longitudinal axis of the lip is preferably substantially parallel to the axial direction of the rotor. The lip preferably extends less than 30% of the circumferential length of the rotor flank and more preferably extends less than 10% of the circumferential length of the rotor flank.

Preferably each rotor flank comprises a lip as hereinbefore described.

Preferably the rotor is a Wankel engine rotor.

In accordance with the present invention, as seen from a second aspect, there is provided a rotary engine rotor comprising three rotor flanks arranged in a generally equilateral triangle shape, each rotor flank having a leading edge and a trailing edge, at least one rotor flank comprising a cavity having a leading edge and a trailing edge, wherein a portion of the base of the cavity proximal to the trailing edge thereof is outwardly curved.

It has been found by the applicants that a rotor in accordance with the second embodiment of the present invention improves the performance of the engine within which the rotor is installed, for example by providing an increase in power and a reduction in temperature. This improvement in performance may be attributed to an increased efficiency in converting combustion gas expansion to torque.

The radius of curvature of the base of the cavity proximal to the trailing edge thereof is preferably between 100 mm and 170 mm and more preferably approximately 150 mm.

The base preferably blends into the rotor flank at the trailing edge of the cavity. There is preferably a tangent blend between the base and the trailing edge of the cavity.

A portion of the base proximal to the leading edge of the cavity may be substantially planar.

Alternatively, a portion of the base proximal to the leading edge of the cavity may be curved radially inwardly. In this embodiment, the radius of curvature of the base proximal to the leading edge of the cavity is preferably substantially smaller than the radius of curvature of the base proximal to the trailing edge of the cavity.

In another alternative embodiment, a portion of the base proximal to the leading edge of the cavity may be curved radially outwardly about a centre of curvature displaced from the centre of curvature of the portion of the base proximal to the trailing edge of the cavity, so as to define a longitudinal valley bounded by convex side walls.

The cavity preferably extends between 80% and 95% of the axial length of the rotor flank and is preferably located substantially axially centrally.

The at least one rotor flank may comprise a secondary cavity having a first part formed in the base of the first cavity and a second part formed in the rotor flank.

Preferably each rotor flank comprises a cavity as hereinbefore described.

Preferably the rotor is a Wankel engine rotor.

DETAILED DESCRIPTION

Figure 1:
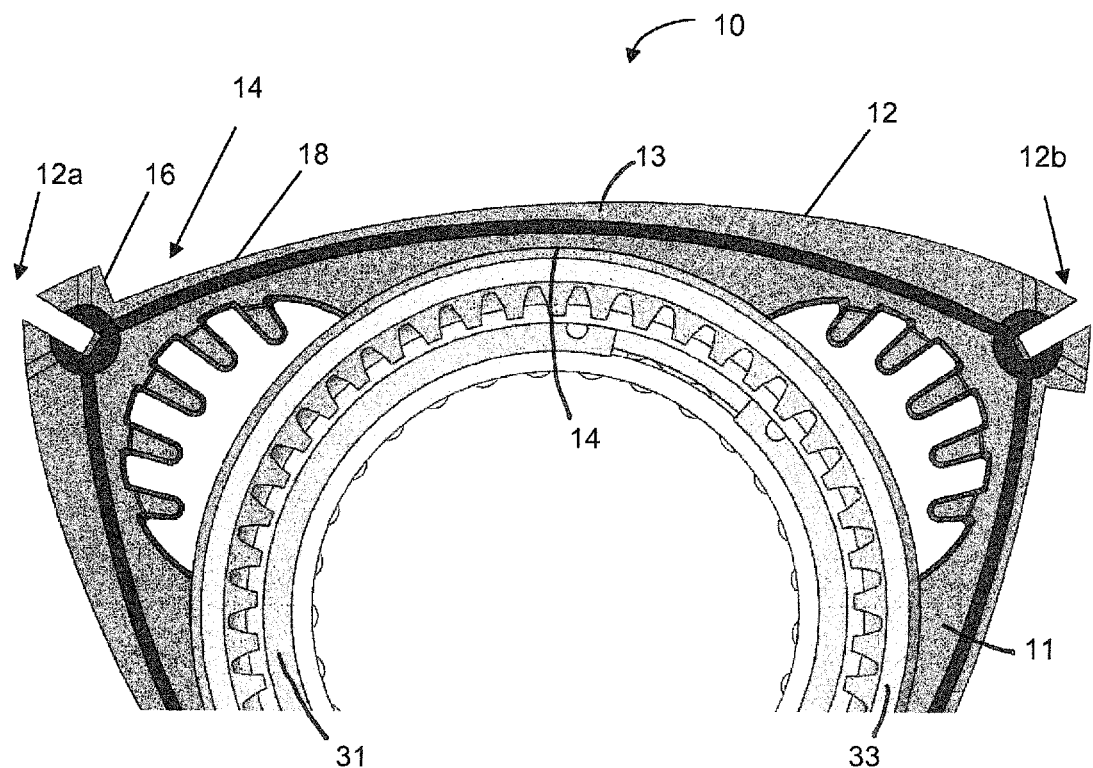
FIG. 1 is a cross-sectional view of a rotary engine rotor in accordance with an embodiment of the present invention.
Figure 2:
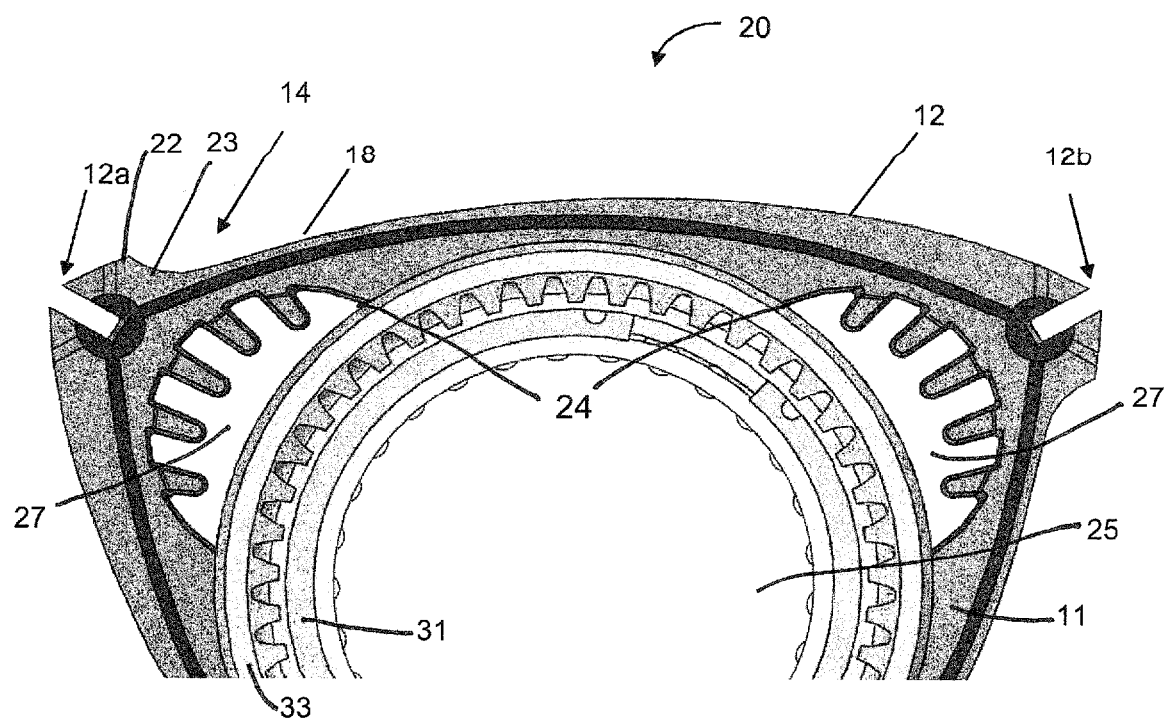
FIG. 2 is a cross-sectional view through a rotary engine rotor illustrated in FIG. 1.

With reference to FIGS. 1 and 2 of the drawings, there is illustrated a rotary engine rotor 10,20 in accordance with a first embodiment of the present invention.

The rotor 10 includes a body 11 formed of three rotor flanks 12 arranged in a generally equilateral triangle shape.

The rotor body 11 may comprise or consist of cast iron, aluminium, aluminium alloy, titanium nickel, cobalt or cobalt alloy. Preferably, the rotor body 11 consists of cast iron.

The rotor body 11 may be formed by casting, machining from billet, sintering or additive manufacturing. Additive manufacturing includes three-dimensional printing. Preferably, the rotor body 11 is formed from a one-piece casting in iron.

Each rotor flank 12 comprises an outer face directed radially outwardly, an inner face 14 directed radially inwardly and first and second side faces directed generally axially. Each rotor flank 12 includes a leading edge 16 and a trailing edge defined with respect to the direction of rotation of the rotor flank 12 (labelled for the uppermost rotor flank 12 only in FIG. 1).

A recess 18 is formed in the outer face of each rotor flank 12. The recess 18 extends from the trailing edge of the respective rotor flank 12 across approximately 95% of the circumferential length of the respective rotor flank 12. It is also envisaged that each rotor flank 12 may contain a recess 18. The recess 18 comprises a leading face 19 and a trailing face 20 defined with respect to the direction of rotation of the rotor flank 12. The leading face 19 of the recess 18 is inwardly curved and comprises a radius of curvature preferably between 0.2-9.0 mm, preferably between 1.0-8.0 mm, preferably between 2.0-7.0 mm, or preferably between 3.0-6.0 mm. The trailing face 20 of the recess 18 is outwardly curved and comprises a radius of curvature orders of magnitude larger than the radius of curvature of the leading face 19, for example approximately 150 mm. The radius of curvature may, however, vary circumferentially across the respective rotor flank 12. In particular, the radius of curvature may increase towards the trailing edge of the respective rotor flank 12. In the illustrated embodiment, the inwardly curved leading face 19 blends into the outwardly trailing face 20 such that the two may be considered a single face having varying circumferentially varying curvature. Axially, the recess 18 extends the full axial length of the respective rotor flank 12. An elongate lip 21 that extends the full axial length of the respective rotor flank 12 is thus defined at the leading edge 16 of the respective rotor flank 12. It is also envisaged that each rotor flank 12 may comprise a lip 21. The longitudinal axis of the lip 21 is substantially parallel to the axial direction of the rotor flank 12 and the cross-section of the lip 21 with respect to this axis is substantially uniform across the length of the lip 21. It is also envisaged that the lip 21 may have a form wherein the direction of the normal to the trailing face of the lip is substantially opposite to the direction of rotation of the rotor.

The lip 21 comprises a leading face 22 and a trailing face 23 defined with respect to the direction of rotation of the rotor flank 12. The leading face 22 of the lip 21 is curved outwardly, the radius of curvature of this face 22 being substantially equal to the radius of curvature of the trailing face 20 of the recess 18. The trailing face 23 of the lip 21 is provided by the leading face 19 of the recess 18 and is thus curved inwardly. The centre of curvature of the trailing face 23 of the lip 21 is located inwardly of the face 23 with respect to the circumferential mid-point of the rotor flank 12. Accordingly, the circumferential vector component of a normal to the trailing face 23 of the lip 21 is directed in an opposite direction to the direction of rotation of the rotor 10. The exact direction of a normal to the trailing face 23 of the lip 21 depends on the surface element under consideration in view of the inwardly curved profile of the face 23, the surface elements located proximal to the leading face 22 of the lip 21 having a larger circumferential vector component than the surface elements located distal to the leading face 22 of the lip 21.

The inner face 14 of each rotor flank 12 comprises a location portion 24 located at the midpoint of the flank 12, the location portions 24 together partly defining a location aperture 25. The inner face 14 of each flank 12 further comprises cooling channel portions located at each end of the flank 12. The cooling channel portions together define three cooling channels 27 that extend axially through the rotor 10 in the region of each apex of the rotor 10. Each respective cooling channel 27 is part cylindrical in shape and provided with cooling fins which are arranged to increase the surface area of said cooling channel 27. In an alternative embodiment (not shown) where the rotor is not cooled by air, the air cooling channels 27 and other corresponding features are not present.

The side faces of each rotor flank 12 are provided with respective sealing strip sockets arranged to receive respective side sealing strips (not shown). Additional sealing strip sockets are provided at the apexes of each rotor flanks 12, these strip sockets being arranged to receive respective axial sealing strips (not shown).

An insert 31 is provided in the location aperture 25 and coupled to the rotor flanks 12 by means of fixing pins (not shown) extending through respective fixing sockets (not shown) formed in the rotor flank 12 and the insert 31. The insert 31 is formed as a forging in an appropriate bearing steel, or from a bar of bearing steel. The insert 31 circumferentially closes the cooling channels 27 defined in the inner faces 14 of the rotor flanks 12 so as to define cooling conduits 32 that extend the full axial length of the rotor 10. The cooling conduits 34 allows for the flow of air through the rotor 10, thereby providing cooling of the engine.

The insert 31 includes a bearing part 33 and an indexing gear. The indexing gear comprises a machined annular gear 34 arranged for eccentric rotation about a central pinion (not shown) of the stator (not shown). The axial length of the annular gear 34 is less than the full axial length of the rotor body 11, the annular gear 34 being disposed at one end axially of the rotor 10.

The rotor 10 is mounted within a cavity (not shown) in a stator (not shown) on an eccentric journal of a main shaft (not shown). The cavity is defined by a two-lobed epitrochoidal bore closed at each end by end plates (not shown). The annular gear 25 is arranged to engage with a fixed pinion (not shown) in a planetary manner in which the rotor 10 rotates at one third of the rotation of the main shaft. The rotor 10 and the walls of the cavity are shaped so that working chambers are formed as the rotor 10 rotates, the walls of the cavity further being provided with inlet and exhaust ports (not shown) for air and exhaust gases respectively. In use, each side sealing strip (not shown) forms a seal between the side 14 of the rotor body 11 and the walls of the cavity provided by the stator (not shown). Similarly, each axial sealing strip (not shown) forms a seal between the respective apex of the rotor flank 12 and the walls of the cavity to divide the cavity into a plurality of working chambers.

In a given working chamber, the expansion of the gas contained therein exerts a force on the outer face of the respective rotor flank 12. The expansion gas pressure is converted into torque across the circumferential length of the rotor flank 12. However, the efficiency of conversion of this expansion gas pressure into torque is substantially greater at the trailing face 23 of the lip than across the remainder of the outer face of the rotor flank 12 due to the direction of the vector surface of the trailing face 23 of the lip 21. The lip 21 thus provides a substantial contribution to the overall efficiency of conversion of expansion gas pressure to torque, without substantially compromising the compression ration of the engine.

Figure 3:
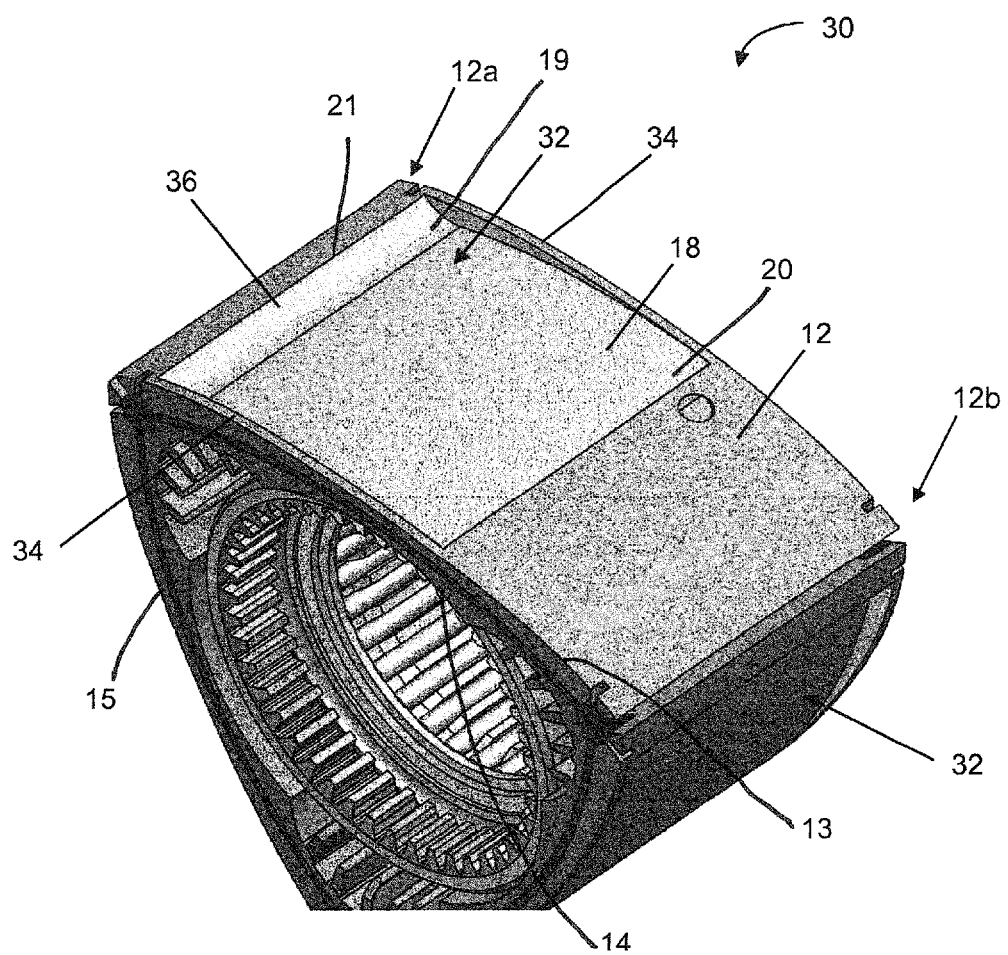
FIG. 3 is a perspective view through a rotary engine rotor in accordance with a second embodiment of the present invention.

A second embodiment of the present invention is illustrated in FIG. 3. The rotor 30 of this embodiment is similar to the rotor 10 of the first embodiment, with the following modifications. The same reference numbers are retailed for corresponding features.

In this embodiment, the leading face 19 of the recess 18, and thus the trailing face 23 of the lip 21, is substantially planar as opposed to inwardly curved. The direction of the normal to the face 19, 23 is substantially opposite to the direction of rotation of the rotor 10. The face 19, 23 is thus optimally directed for conversion of combustion gas expansion to torque.

In an alternative embodiment (not shown), the direction of the normal to the face 19, 23 may not be substantially opposite to the direction of rotation of the rotor 10: providing the circumferential component of the normal to the face 19, 23 is opposite to the direction of rotation of the rotor 10, the lip 21 will provide an increase in the efficiency of conversion of expansion gas pressure to torque. This alternative embodiment will, however, not provide the same increase in efficiency of conversion of expansion gas pressure to torque as the embodiment illustrated in FIG. 3.

Figure 4:
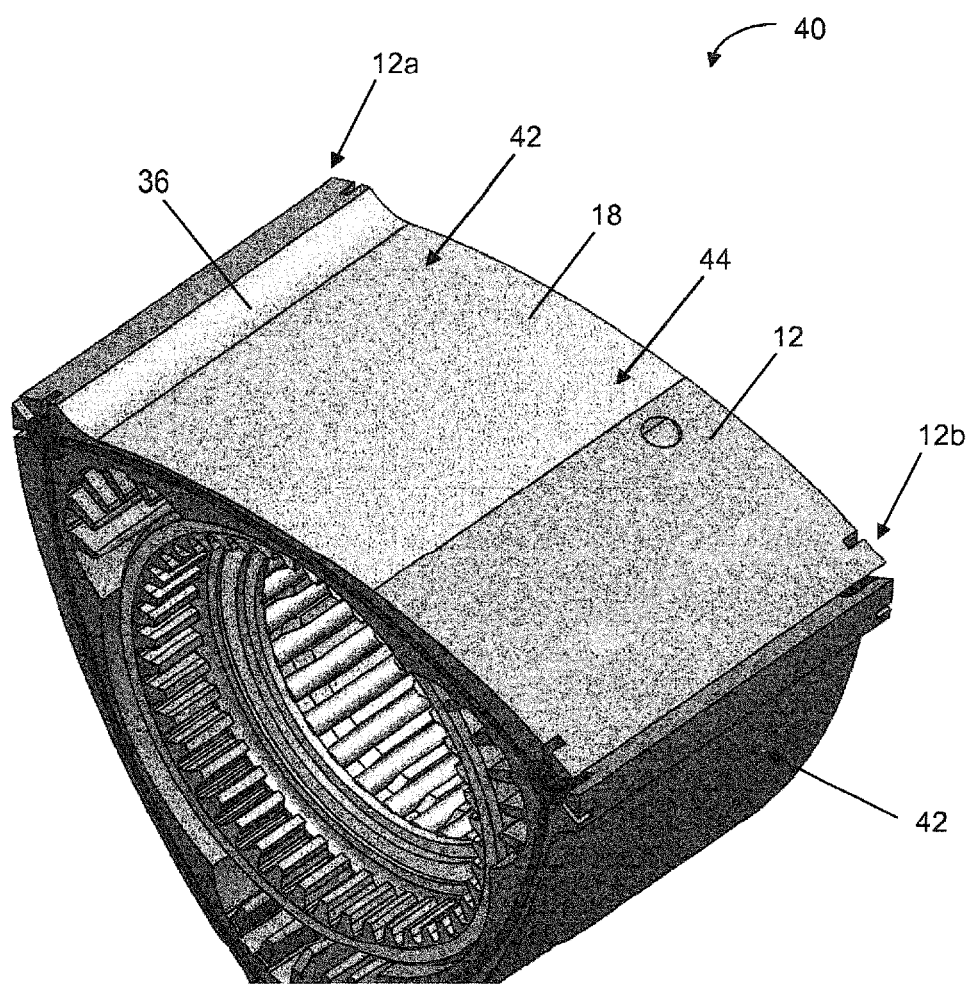
FIG. 4 is a perspective view of a rotary engine rotor in accordance with a third embodiment of the present invention.

A third embodiment of the invention is illustrated in FIG. 4. The rotor 40 of this embodiment is similar to the rotor 10 of the first and second embodiments, with the following modifications. The same reference numbers are retailed for corresponding features.

In this embodiment, the recess 18 extends approximately 75% of the circumferential length of the respective rotor flank 12. The recess 18 is located towards the leading edge 36 of the rotor flank but is separated therefrom such that the recess 18 is bounded at the leading edge 16 of the rotor flank.

The recess 18 formed in the outer face 42 of each rotor flank 12 does not extend the full axial length of the respective rotor flank 12. Instead, the recess 18 extends approximately 90% of the axial length of the rotor flank and is located axially centrally. Unlike the embodiments illustrated in FIGS. 1 to 3, the outer face 42 of each rotor flank 12 thus does not comprise a lip. Furthermore, unlike the embodiments illustrated in FIGS. 1 to 3, the recess is thus fully bounded at the axial and circumferential edges thereof and thus defines a cavity having a base and side-walls 35.

The side walls 35 are substantially planar, the normal to the side 35 walls being in the axial direction. In an alternative embodiment (not shown), the side walls have a radius of curvature preferably between 0.2-9.0 mm Like the embodiment illustrated in FIGS. 1 and 2, the base of the recess 18 comprises a leading face 19 and a trailing face 20 defined with respect to the direction of rotation of the rotor flank 12. The leading face 19 of the recess 18 is curved inwardly and comprises a radius of curvature of between 0.2-9.0 mm, preferably between 1.0-8.0 mm, preferably between 2.0-7.0 mm, or preferably between 3.0-6.0 mm. The trailing face 20 of the recess is curved outwardly and comprises a radius of curvature orders of magnitude larger than the radius of curvature of the leading face 19, for example approximately 150 mm. The radius of curvature may, however, vary circumferentially across the respective rotor flank 12. In particular, the radius of curvature may increase towards the trailing edge of the respective rotor flank 12. In the illustrated embodiment, the inwardly curved leading face 19 blends into the outwardly trailing face 20 such that the two may be considered a single face having varying circumferentially varying curvature. In addition, the trailing face 20 of the base of the recess 18 blends into the outer face 42 of the rotor flank 12 at the trailing edge of the recess 18.

Figure 5:
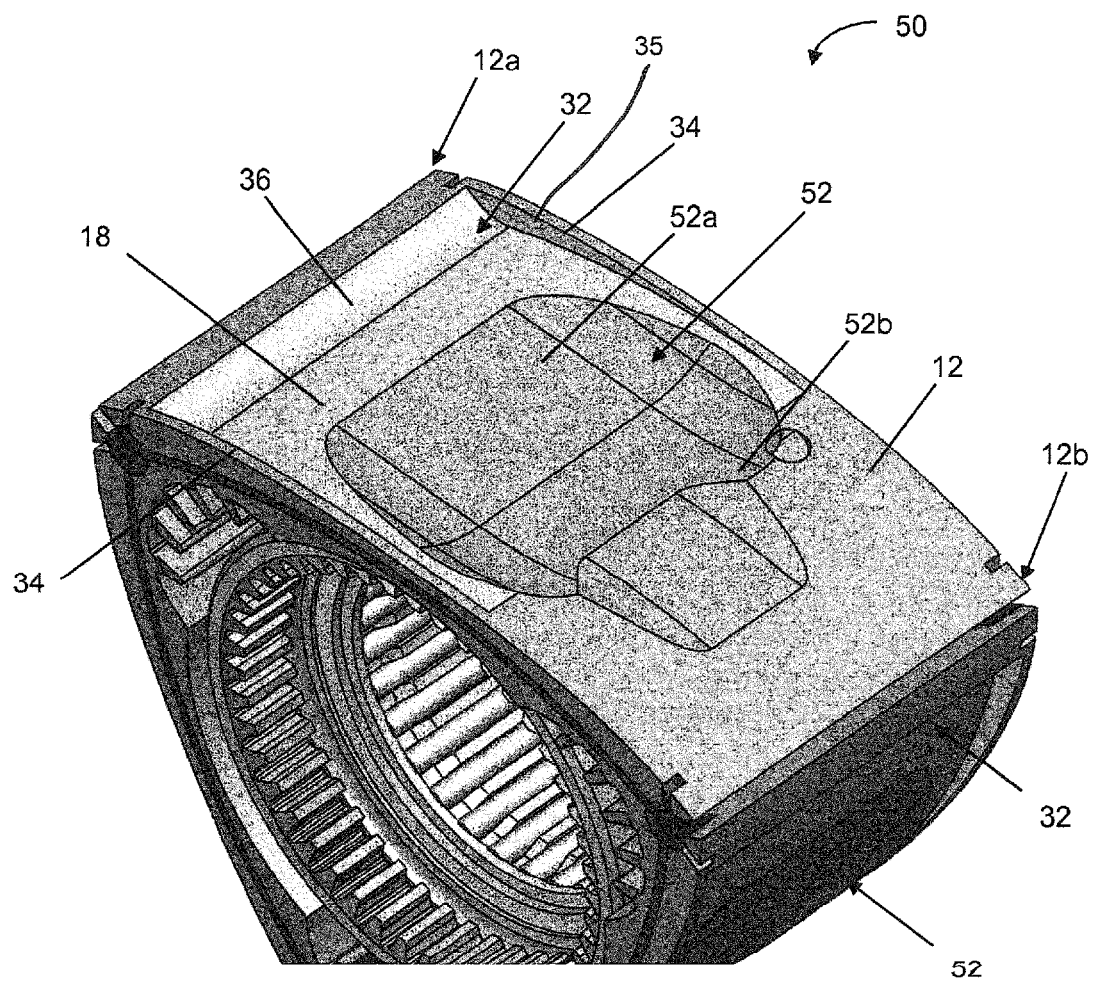
FIG. 5 is a perspective view of a rotary engine rotor in accordance with a fourth embodiment of the present invention.

A fourth embodiment of the invention is illustrated in FIG. 5. The rotor 50 of this embodiment is similar to the rotor 40 of the third embodiment, with the following modifications. The same reference numbers are retailed for corresponding features.

In this embodiment, the recesses 18 provided in the outer surfaces of the rotor flanks 12 are substantially identical to the recesses 18 of the embodiment illustrated in FIG. 4 with the exception that a secondary cavity 52 is provided in each rotor flank 12. The secondary cavity 52 comprises a first part 52a having a generally rounded rectangular shape and a second part 52b having a shape similar to the blade of a shovel. The first part 52a spans the base of the recess 18 and the rotor flank 12, whilst the second part is formed solely in the rotor flank 12.

Figure 6:
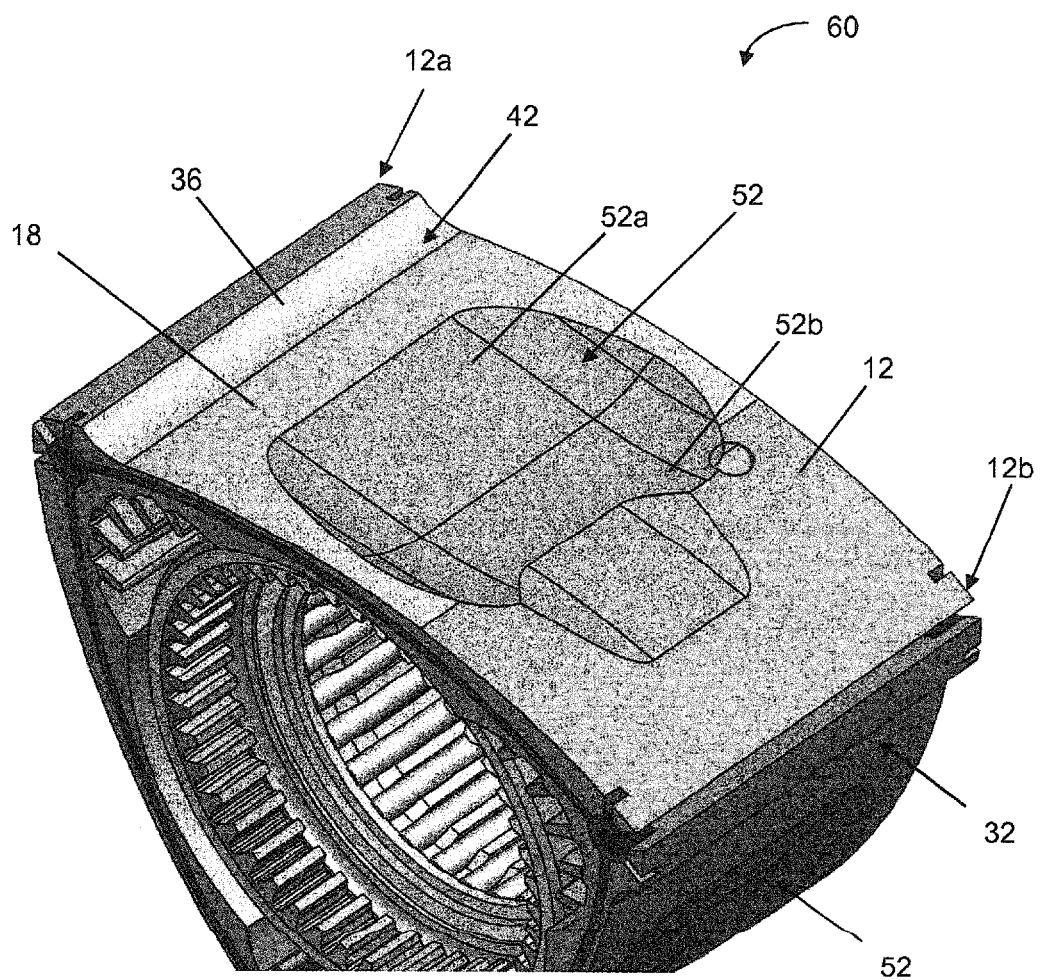
FIG. 6 is a perspective view of a rotary engine rotor in accordance with a fifth embodiment of the present invention.

In an alternative embodiment (not shown) of a rotor 60 shown in FIG. 6, the rotor flank 12 illustrated in FIG. 2 may also have a secondary cavity 52 as described in the fourth embodiment.

In another alternative embodiment (not shown), the leading face of the recess may be substantially planar, for example the recess may have a cross-section similar to the cross-section of the recess 18 illustrated in FIG. 3.

The invention claimed is:

1. A rotary engine rotor comprising three rotor flanks arranged in a generally equilateral triangle shape, each rotor flank having a leading edge and a trailing edge
    wherein the leading edge of at least one of the rotor flanks comprises an elongate lip that extends the full axial length of the rotor flank, and
    characterized in that the at least one rotor flank comprises a recess formed in the outer surface therein, the recess comprising a leading edge and a trailing edge, the recess extending axially between substantially planar side walls and across the length of the rotor flank, the lip being defined between the leading edge of the rotor flank and the leading edge of the recess;
    wherein the lip comprises a leading face and a trailing face and wherein the trailing face of the lip is curved radially inwardly.

2. A rotary engine rotor according to claim 1, wherein the at least one rotor flank comprises a generally outwardly curved profile from the lip to the trailing edge of the rotor flank.

3. A rotary engine rotor according to claim 1, wherein a leading face of the lip is directed outwardly with respect to the circumferential center of the rotor flank.

4. A rotary engine rotor according to claim 1, wherein a trailing face of the lip is directed inwardly towards the circumferential center of the rotor flank.

5. A rotary engine rotor according to claim 1, wherein the leading face of the lip is curved outwardly.

6. A rotary engine rotor according to claim 5, wherein the radius of curvature of the leading face of the lip is substantially equal to the radius of curvature of the at least one rotor flank proximal to the trailing edge thereof.

* * * * *